United States Patent
Hong et al.

(10) Patent No.: US 8,897,304 B2
(45) Date of Patent: Nov. 25, 2014

(54) PACKET GENERATING METHOD IN WIRELESS HDMI CEC

(75) Inventors: Jin-woo Hong, Suwon-si (KR); Dae-gyu Bae, Suwon-si (KR); Dong-young Kim, Seongnam-si (KR); Ho-jeong You, Suwon-si (KR); Si-hong Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 600 days.

(21) Appl. No.: 11/931,783

(22) Filed: Oct. 31, 2007

(65) Prior Publication Data

US 2008/0291324 A1 Nov. 27, 2008

(30) Foreign Application Priority Data

May 22, 2007 (KR) .................. 10-2007-0049641

(51) Int. Cl.
| | | |
|---|---|---|
| *H04L 12/28* | (2006.01) | |
| *H04N 21/41* | (2011.01) | |
| *H04N 5/77* | (2006.01) | |
| *H04N 21/235* | (2011.01) | |
| *H04N 21/435* | (2011.01) | |
| *H04N 21/4363* | (2011.01) | |
| *H04L 1/16* | (2006.01) | |
| *G09G 5/00* | (2006.01) | |

(52) U.S. Cl.
CPC .......... *H04N 5/772* (2013.01); *H04N 21/4135* (2013.01); *H04L 1/16* (2013.01); *H04N 21/235* (2013.01); *G09G 2370/04* (2013.01); *H04N 21/435* (2013.01); *H04N 21/43637* (2013.01); *G09G 5/006* (2013.01)

USPC ................ 370/395.2; 370/395.1; 370/395.21; 370/395.3; 348/484; 348/473; 348/469

(58) Field of Classification Search
USPC ................ 370/252, 399, 445, 468, 528, 477; 375/316; 348/484
See application file for complete search history.

(56) References Cited

U.S. PATENT DOCUMENTS

| | | | |
|---|---|---|---|
| 7,483,996 B2* | 1/2009 | Townsley et al. | 709/236 |
| 2003/0098992 A1 | 5/2003 | Park et al. | |
| 2003/0103526 A1* | 6/2003 | McBride et al. | 370/466 |
| 2004/0233927 A1* | 11/2004 | Hirosawa | 370/445 |
| 2005/0165967 A1* | 7/2005 | Woolgar | 710/1 |
| 2006/0168270 A1 | 7/2006 | Townsley et al. | |

(Continued)

FOREIGN PATENT DOCUMENTS

KR 10-2004-0111504 A 12/2004

OTHER PUBLICATIONS

Communication issued May 4, 2012 by the State Intellectual Property Office of the People's Republic of China in counterpart Chinese Application No. 200810005709.5.

(Continued)

*Primary Examiner* — Anez Ebrahim
(74) *Attorney, Agent, or Firm* — Sughrue Mion, PLLC

(57) ABSTRACT

A packet generating method in a wireless High Definition Multimedia Interface (HDMI) environment includes generating a packet which includes either AV data or control data in a payload and a field indicative of a packet type in a header according to a HDMI environment; and transmitting the generated packet. Accordingly, the AV data and the control data can be transceived over the single channel in the HDMI.

12 Claims, 3 Drawing Sheets

(56) References Cited

U.S. PATENT DOCUMENTS

| | | |
|---|---|---|
| 2006/0209745 A1 | 9/2006 | MacMullan et al. |
| 2006/0209890 A1* | 9/2006 | MacMullan et al. ........... 370/468 |
| 2006/0209892 A1 | 9/2006 | MacMullan et al. |
| 2007/0097985 A1* | 5/2007 | Lee .......................... 370/395.21 |
| 2007/0201475 A1* | 8/2007 | Li et al. ......................... 370/392 |
| 2008/0010412 A1* | 1/2008 | Iwata et al. ................... 711/128 |
| 2008/0317181 A1* | 12/2008 | Suzuki et al. ................. 375/355 |

OTHER PUBLICATIONS

Communication dated Jul. 20, 2013 issued by the Korean Intellectual Property Office in counterpart Korean Patent Application No. 10-2007-0049641.

* cited by examiner

PACKET GENERATING METHOD IN WIRELESS HDMI CEC

CROSS-REFERENCE TO RELATED APPLICATIONS

This application claims priority from Korean Patent Application No. 10-2007-0049641, filed on May 22, 2007, in the Korean Intellectual Property Office, the disclosure of which is incorporated herein by reference in its entirety.

BACKGROUND

1. Field of the Invention

Apparatuses and methods consistent with the present invention relate to High Definition Multimedia Interface (HDMI) Consumer Electronics Control (CEC), and more particularly, to a packet generating method according to a HDMI CEC specification.

2. Description of the Related Art

High Definition Multimedia Interface (HDMI) is a digital interface based on the Digital Video Interactive (DVI) standard for connecting a PC to a monitor, and enables to transmit and receive high-definition video and audio.

The HDMI has three independent channels of Transition Minimized Differential Signaling (TMDS), a Display Data Channel (DDC), and a Consumer Electronics Control (CEC) channel. The HDMI uses a single physical cable to transmit and receive AV data, device information, and control commands.

Particularly, the HDMI CEC channel is used to transfer control commands among devices connected through a HDMI cable. For example, when a DTV is connected to a DVD player through a HDMI cable and a command for controlling the DVD player is transferred to the DTV through a remote controller of the DTV, the DTV forwards the control command to the DVD player over the HDMI CEC channel. As a further example, when the DVD player enters a standby mode for a certain time period, a control command corresponding to the standby mode is delivered over the HDMI CEC channel to switch the DTV to the standby mode.

As such, the HDMI specification, which is the cable interface specification, has not yet standardized the wireless HDMI. Also, the wireless HDMI CEC is not standardized.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention has been provided to solve the above-mentioned and/or other problems and disadvantages and an aspect of the present invention provides a method for generating a packet including a field indicative of a packet type so that a receiver can acquire the type of the received packet in an environment where AV packets and control packets can be transmitted and received over a single channel according to the wireless HDMI CEC condition.

According to an aspect of the present invention, a packet generating method may include generating a packet which comprises either AV data or control data in a payload and a field indicative of a packet type in a header within a HDMI environment, and transmitting the generated packet.

In accordance with another aspect of the present invention, the packet comprises either the AV data in the payload, and the field indicative of the packet type set to AV packet type in the header, or the control data in the payload, and the field indicative of the packet type set to control packet type in the header.

In accordance with another aspect of the present invention, the AV packet and the control packet are transmitted over a single wireless channel.

In accordance with another aspect of the present invention, the packet excludes an End of Message (EOM) bit or an ACK bit.

In accordance with another aspect of the present invention, the control data in the payload comprises a field indicative of a type of control data.

In accordance with another aspect of the present invention, the generating comprises generating control data, the control data comprising a control command in the payload, either a field indicative of the control data as the control data type, or ACK data in response to the data transmitted to the payload in a header, and a field indicative of the control data as the ACK data type.

In accordance with another aspect of the present invention, the control data type may indicate that the control data is PING data type.

In accordance with another aspect of the present invention, the control data is Consumer Electronics Control (CEC) data.

In accordance with another aspect of the present invention, a packet determining method may include receiving a packet, and determining whether either AV data or control data is formed in a payload according to a wireless HDMI environment by examining a field indicative of a packet type in a header of the packet.

In accordance with another aspect of the present invention, the packet comprises either the AV data in the payload, and the field indicative of the packet type set to AV packet type in the header, or the control data in the payload, and the field indicative of the packet as the control packet type in the header.

In accordance with another aspect of the present invention, the AV packet and the control packet are transmitted over a single wireless channel.

In accordance with another aspect of the present invention, the packet excludes an EOM bit or an ACK bit.

In accordance with another aspect of the present invention, the control data in the payload comprises a field indicative of a type of control data.

In accordance with another aspect of the present invention, the determining comprises determining control data, the control data comprising a control command in the payload, either a field indicative of the control data as the control data type, or ACK data in response to the data transmitted to the payload in a header, and a field indicative of the control data as the ACK data type.

In accordance with another aspect of the present invention, the control data generates control data including a field indicative of the control data as PING data type.

In accordance with another aspect of the present invention, the control data is Consumer Electronics Control (CEC) data.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will now be described in greater detail with reference to the accompanying drawings.

Figure 1:
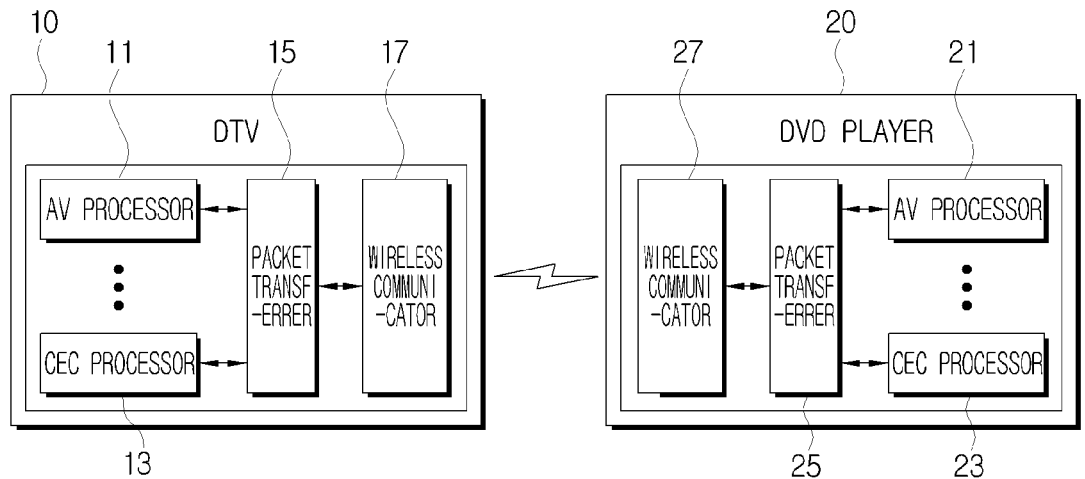
FIG. 1 depicts a video system to which the present invention is applicable.

FIG. 1 depicts a video system to which the present invention is applicable. The video system of FIG. 1 is constituted by connecting a DTV 10, a kind of an AV device, to a DVD player 20 in a HDMI CEC environment.

The DTV 10 comprises an AV processor 11, a CEC processor 13, a packet transferrer 15, and a wireless communicator 17.

The AV processor 11 performs processes for generating an AV packet, or reproducing or storing an AV packet received from the DVD player 20 which is the external AV device.

The CEC processor 13 performs processes for generating a CEC packet or executing a control as contained in a CEC packet received from the DVD player 20.

The packet transferrer 15 forwards the AV packet generated at the AV processor 11 or the CEC packet generated at the CEC processor 13 to the wireless communicator 17, which is to be explained.

The packet transferrer 15 determines a type of the packet received at the wireless communicator 17 from the DVD player 20, and forwards the received packet to the AV processor 11 or the CEC processor 13 based on the determined type. In doing so, the packet transferrer 15 determines the packet type by referring to data in a field indicative of the packet type in a header of the received packet.

In further detail, the packet transferrer 15 forwards the AV packet received at the wireless communicator 17 from the DVD player 20 to the AV processor 11, and forwards the CEC packet to the CEC processor 13.

The wireless communicator 17 transmits the AV packet and the CEC packet provided from the packet transferrer 15 to the DVD player 20. While transmitting the AV packet, the wireless communicator 17 can transmit the CEC packet over one channel.

The wireless communicator 17 receives AV packet and CEC packet from the DVD player 20 and forwards them to the packet transferrer 15. In doing so, the wireless communicator 17 receives the AV packet and the CEC packet over one channel.

Descriptions about the DVD player 20, an AV processor 21, a CEC processor 23, a packet transferrer 25, and a wireless communicator 27 can be inferred from the DTV 10, the AV processor 11, the CEC processor 13, the packet transferrer 15, and the wireless communicator 17 and thus shall be omitted.

Figure 2:
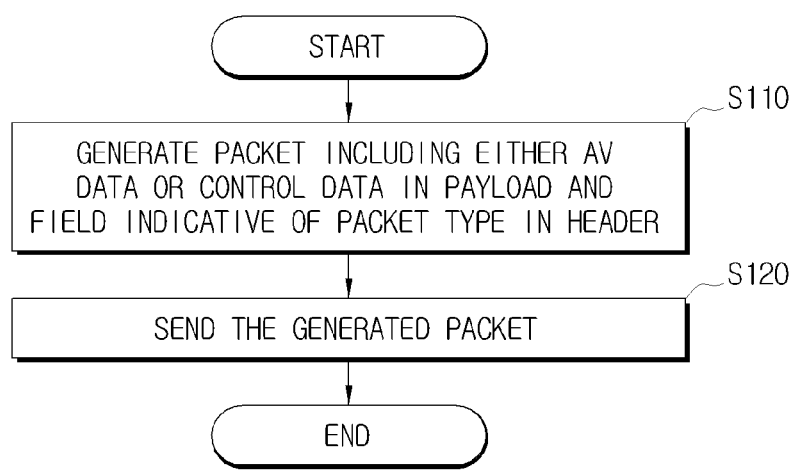
FIG. 2 is a flowchart of a packet generating method in a wireless HDMI CEC environment according to an embodiment of the present invention.

Now, a packet generating method of the AV device (the DTV 10 or the DVD player 20) of FIG. 1 in the wireless HDMI CEC environment is illustrated by referring to FIG. 2. FIG. 2 is a flowchart of the packet generating method in the wireless HDMI CEC environment according to an embodiment of the present invention.

As shown in FIG. 2, the AV device 10 or 20 generates a packet including AV data or CEC data, a kind of control data, in a payload and a field indicative of the packet type in a header (S110).

Specifically, the AV processor 11 or 21 of the AV device 10 or 20 generates the packet including the AV data in the payload and the field indicative of the packet type "AV packet" in the header. The CEC processor 13 or 23 of the AV device 10 or 20 generates the packet including the CEC data in the payload and the field indicative of the packet type "CEC packet" in the header.

The AV device 10 or 20 transmits the generated packet (S120). The step S120 is performed by the wireless communicator 17 which receives the packet generated at the AV processor 11 or the CEC processor 13 from the packet transferrer 15.

Figure 3:
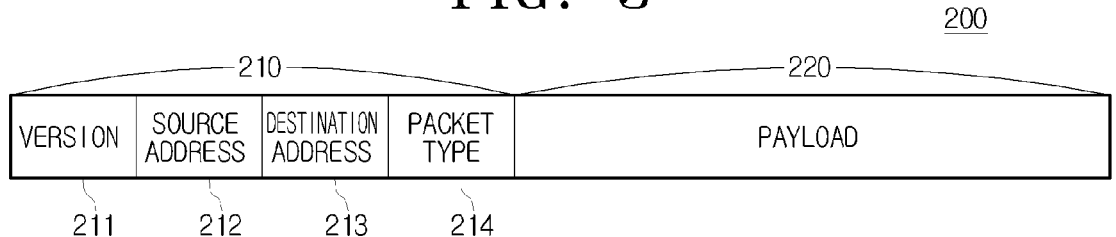
FIG. 3 depicts a wireless HDMI packet to which the present invention is applicable.

The packet generated in step S110 is explained in further detail. FIG. 3 shows a wireless HDMI packet to which the present invention is applicable. The wireless HDMI packet 200 of FIG. 3 is divided to a header 210 and a payload 220. The header 210 comprises a version field 211, a source address field 212, a destination address field 213, and a packet type field 214. The payload 220 carries actual data.

The version field 211 conveys information relating to the version of the wireless HDMI. The source address field 212 contains a physical address of the AV device generating and transmitting the packet in the wireless network. The destination address field 213 contains a physical address of the AV device the packet is destined for, in the wireless network.

The packet type field 214 contains information as to the packet type. The packet type is determined by the data type in the payload 220. Hence, the information as to the packet type in the packet type field 214 is determined by the data type of the payload 220.

When the payload 220 comprises AV data, the packet type field 214 comprises a code indicative of the packet type "AV packet". When the payload 220 comprises a "CEC packet", the packet type field 214 comprises a code indicative of the packet type "CEC packet".

Figure 4:
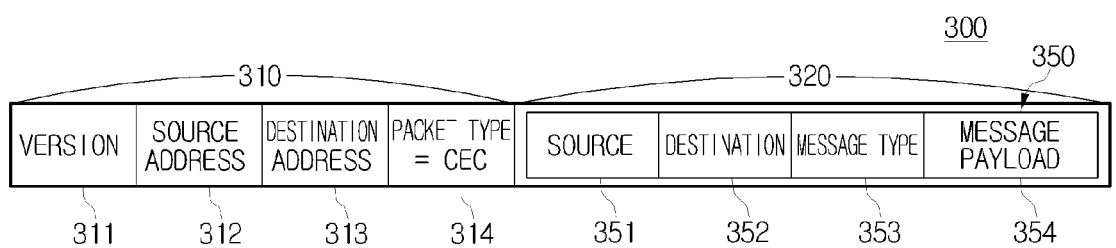
FIG. 4 depicts a wireless HDMI CEC packet which is a kind of the wireless HDMI packet.

FIG. 4 depicts a wireless HDMI CEC packet which is a kind of the wireless HDMI packet. The wireless HDMI CEC packet 300 of FIG. 4 is constituted based on the wireless HDMI packet of FIG. 3, and carries control data.

A payload 320 of the wireless HDMI CEC packet 300 comprises CEC data as control data of a message form 350. The message 350 comprises a source field 351 containing a logical address of the AV device transmitting the wireless HDMI CEC packet 300, a destination field 352 containing a logical address of the AV device receiving the wireless HDMI CEC packet 300, a message type field 353 containing information indicative of the message type, and a message payload 354 containing actual control data (CEC data).

A header 310 of the wireless HDMI CEC packet 300 comprises a version field 311, a source address field 312, a destination address field 313, and a packet type field 314. The packet type field 314 contains information "CEC" signifying that the packet is the wireless HDMI CEC packet 300 (that is, the data in the payload 320 is the CEC data).

Similar to the wired HDMI packet, the message 350 comprises the source field 351 and the destination field 352. After the source field 351 and the destination field 352, the message type field 353 and the payload 354 are positioned.

Since the message size can be acquired from the message type 353 in the packet structure, the message 350 may not comprise an End of Message (EOM) bit indicative of the end of the message 350.

Unlike the wired HDMI, the wireless HDMI communicates packet by packet and comprises no ACK bit for answering back using a bit. The AV device receiving the packet may generate ACK for the reception acknowledgement using a packet and sending the packet, which is described by referring to FIG. 5.

Figure 5:
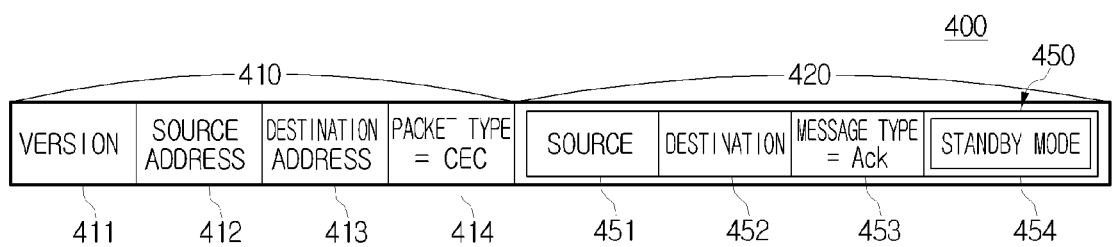
FIG. 5 depicts a wireless HDMI ACK packet which is a kind of the wireless HDMI CEC packet.

FIG. 5 depicts a wireless HDMI ACK packet which is a kind of the wireless HDMI CEC packet. The HDMI ACK packet 400 of FIG. 5 carries an ACK message 450 of the message form in a payload 420. The ACK message 450 comprises a message payload 454 containing information signifying which message is acknowledged. A message type 453 comprises information indicative of the ACK message 450.

The wireless HDMI ACK packet 400 of FIG. 5 is constituted to acknowledge in response to a message relating to 'standby mode'. The message payload 454 contains 'standby mode' and the message type field 453 contains 'ACK' as the information indicative of the type of the ACK message 450.

Figure 6:
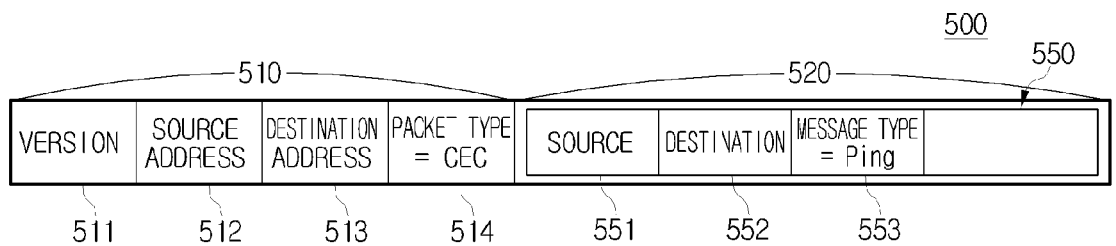
FIG. 6 depicts a wireless HDMI PING packet which is a kind of the wireless HDMI CEC packet.

Meanwhile, the AV device can generate a wireless HDMI PING packet as the packet including a control message to check whether the AV device exists in terms of the logical address, which is now explained. FIG. 6 depicts a wireless HDMI PING packet which is a kind of the wireless HDMI CEC packet.

The HDMI PING packet 500 of FIG. 6 comprises a PING message 550 of the message form in a payload 520. The PING message 550 does not comprise a message payload. A message type 553 contains information indicative of the PING message 550.

The packet can be generated and transmitted by including the field indicative of the packet type in the packet header depending on the data type in the payload constituted as above, and the data can be processed upon receiving the packet and determining the packet type.

Figure 7:
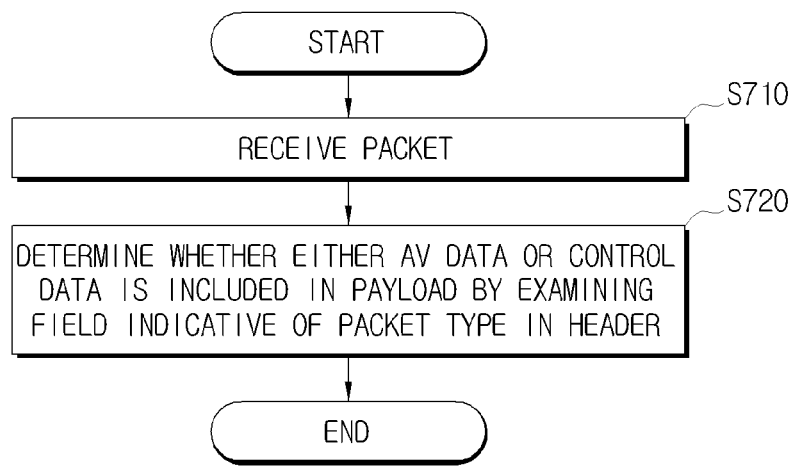
FIG. 7 is a flowchart of a packet determining method in the wireless HDMI CEC environment according to an embodiment of the present invention.

FIG. 7 is a flowchart of a packet determining method in the wireless HDMI CEC environment according to an embodiment of the present invention.

The AV device 10 or 20 receives a packet (S710). In S710, the packet is received through the wireless communicator 17 or 27 and forwarded to the packet transferrer 15 or 25.

Next, the AV device 10 or 20 determines which one of the AV data and the CEC data being the control data is contained in the payload by examining the field indicative of the packet type in the packet header (S720).

Specifically, the packet transferrer 15 or 25 of the AV device 10 or 20 checks whether the field indicative of the packet type in the packet header comprises "AV packet" or "CEC packet", and provides the packet to the AV processor 11 or 21 or the CEC processor 13 or 23. When the field indicative of the packet type is "AV packet", the packet transferrer 15 or 25 applies the packet to the AV processor 11 or 21. When the field indicative of the packet type is "CEC packet", the packet transferrer 15 or 25 applies the packet to the CEC processor 13 or 23.

The packet received at the AV device 10 or 20 is generated as shown in FIGS. 2 through 6 and shall not further explained.

As above, the packets of FIGS. 3 through 6 can be generated by including the field indicative of the packet type in the packet header depending on the data type comprised in the payload. Accordingly, the AV data and the control data can be transceived over the single wireless channel in the wireless HDMI.

Now, according to another embodiment of the present invention, the AV data and the control data are transceived over two channels, rather than one channel, in the wireless HDMI.

When the wireless HDMI provides a multi-channel to send data over two channels, the control message is transceived by allocating another channel for the wireless control data channel in addition to the AV data channel of the wireless HDMI.

That method does not need to specify the packet type in every packet but requires information relating to which is the CEC data channel. Since each connected device has to transmit and receive messages in relation to the multi-channel, a physical layer should allow the physical transmission and reception over two channels at the same time.

According to a further embodiment of the present invention, the CEC data can be separately supported using the wireless HDMI and other wireless techniques (e.g., IEEE 802.11.x, Bluetooth, UWB, and so on). This method requires separate physical layers for the wireless HDMI and the other wireless technique respectively.

In light of the foregoing, the packet is generated and transmitted in the wireless HDMI environment by including either the AV data or the control data in the payload, and the field indicative of the packet type in the header. Therefore, the AV data and the control data can be transceived over the single channel in the wireless HDMI.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A packet generating method comprising:
   generating a packet which comprises control data in a payload and a field indicative of a packet type in a header according to a High Definition Multimedia Interface (HDMI) environment; and
   transmitting wirelessly, the generated packet,
   wherein the control data in the payload comprises a field indicative of a type of control data,
   wherein the field indicative of the packet type in the header indicates Consumer Electronics Control (CEC) packet type and the control data is Consumer Electronics Control (CEC) data, and
   wherein the generating comprises generating control data, the control data comprising either a control command in the payload of the control data and a field indicative of the control data as the control data type in a header of the control data, or ACK data in response to a transmitted control data in the payload of the control data and a field indicative of the control data as the ACK data type in the header of the control data,
   wherein the generating the packet comprises generating an AV packet, and the AV packet and the control packet are transmitted over a single wireless channel.

2. The packet generating method of claim 1, wherein the packet comprises either the AV data in the payload, and the field indicative of the packet type set to AV packet type in the header, or the control data in the payload, and the field indicative of the packet type set to control packet type in the header.

3. The packet generating method of claim 1, wherein the packet excludes an ACK bit.

4. The packet generating method of claim 1, wherein the control data includes a field indicating that the control data is PING data type.

5. The packet generating method of claim 1, wherein the packet comprises the Consumer Electronics Control (CEC) data in the payload.

6. The packet generating method of claim 1, wherein the packet excludes an End of Message (EOM) bit.

7. A packet determining method comprising:
   receiving a packet; and
   determining, by an A/V device, whether the packet is an AV packet, and whether control data is in a payload according to a wireless HDMI environment by examining a field indicative of a packet type in a header of the packet,
   wherein the control data is Consumer Electronics Control (CEC) data,
   wherein the control data in the payload comprises a field indicative of a type of control data,
   wherein the field indicative of the packet type in the header indicates Consumer Electronics Control (CEC) packet type, and
   wherein the determining comprises determining control data, the control data comprising either a control command in the payload of the control data and a field indicative of the control data as the control data type in a header of the control data, or ACK data in response to a transmitted control data in the payload of the control data and a field indicative of the control data as the ACK data type in the header of the control data,
   wherein the AV packet and the control data are transmitted over a single wireless channel.

8. The packet determining method of claim 7, wherein the packet comprises either the AV data in the payload, and the field indicative of the packet type set to AV packet type in the header, or the control data in the payload, and the field indicative of the packet type set to control packet type in the header.

9. The packet determining method of claim 7, wherein packet excludes an ACK bit.

10. The packet determining method of claim 7, wherein the control data generates control data including a field indicative of the control data as PING data type.

11. The packet determining method of claim 7, wherein the payload contains the CEC data.

12. The packet determining method of claim 7, wherein the packet excludes an End of Message (EOM) bit.

* * * * *